(12) United States Patent
Chou

(10) Patent No.: US 8,306,539 B2
(45) Date of Patent: Nov. 6, 2012

(54) EFFICIENT HANDOVER MEASUREMENTS FOR WIRELESS MULTI-RAT SYSTEMS

(75) Inventor: Chie-Ming Chou, Cingshuei Township (TW)

(73) Assignee: Industrial Technology Research Institute, Hsinchu (TW)

( * ) Notice: Subject to any disclaimer, the term of this patent is extended or adjusted under 35 U.S.C. 154(b) by 1133 days.

(21) Appl. No.: 12/183,603

(22) Filed: Jul. 31, 2008

(65) Prior Publication Data

US 2009/0117891 A1    May 7, 2009

Related U.S. Application Data

(60) Provisional application No. 60/996,103, filed on Nov. 1, 2007.

(51) Int. Cl.
*H04W 36/00* (2009.01)

(52) U.S. Cl. .......................... 455/437; 455/434; 370/331

(58) Field of Classification Search .................. 455/423, 455/432.1, 434, 436, 437, 450, 458, 515, 455/550, 552.1

See application file for complete search history.

(56) References Cited

U.S. PATENT DOCUMENTS

| | | | |
|---|---|---|---|
| 6,982,949 B2 | 1/2006 | Guo et al. | |
| 7,065,376 B2 | 6/2006 | Wolman et al. | |
| 7,313,116 B2 * | 12/2007 | Lee et al. | 370/335 |
| 7,460,867 B2 * | 12/2008 | Kim et al. | 455/434 |
| 7,574,210 B2 * | 8/2009 | Kim et al. | 455/436 |
| 2003/0119550 A1 * | 6/2003 | Rinne et al. | 455/553 |
| 2005/0272425 A1 * | 12/2005 | Amerga et al. | 455/436 |
| 2006/0252377 A1 * | 11/2006 | Jeong et al. | 455/67.13 |
| 2007/0110022 A1 | 5/2007 | Palenius et al. | |

OTHER PUBLICATIONS

Draft Standard for Local and Metropolitan Area Networks, Part 16: Air Interface for Broadband Wireless Access Systems, 2008 IEEE, P802.16Rev2/D3, Feb. 2008, pp. 1-1812.

* cited by examiner

*Primary Examiner* — George Eng
*Assistant Examiner* — Hung Du
(74) *Attorney, Agent, or Firm* — Finnegan, Henderson, Farabow, Garrett & Dunner, L.L.P.

(57) ABSTRACT

A method for scheduling one or more handover measurements to be performed by a user terminal in a communications system using a plurality of radio access technologies (RATs), wherein the user terminal is in communication with a serving network interface device and is in the neighborhood of one or more neighboring network interface devices. The method includes gathering timing information of the one or more neighboring network interface devices, and determining at least one scanning interval using the timing information of the one or more neighboring network interface devices, the at least one scanning interval being a time period during which the user terminal performs the one or more handover measurements by measuring signals of the one or more neighboring network interface devices.

20 Claims, 5 Drawing Sheets

EFFICIENT HANDOVER MEASUREMENTS FOR WIRELESS MULTI-RAT SYSTEMS

BENEFIT OF PRIORITY

The present application is related to, and claims the benefit of priority of, U.S. Provisional Application No. 60/996,103, filed on Nov. 1, 2007, entitled "An Efficient Measurement Control for Wireless Multi-Systems," the entire contents of which are incorporated herein by reference.

FIELD OF THE INVENTION

This invention relates in general to methods and apparatus for scheduling handover measurements in a wireless system using multiple radio access technologies.

BACKGROUND

Several types of communications networks exist today, including, for example, computer networks such as wide area networks (WANs), metropolitan area networks (MANs), local area networks (LANs), and personal area networks (PANs), and cellular networks. User terminals may communicate with the networks wirelessly, e.g., through radio frequency (RF) connections or infrared (IF) connections. The interface between the network and such wireless user terminals is generally called the air interface. Interface devices exist on both sides of the air interface. The interface device in the user terminal may be a wireless adapter, a cellular phone, etc. The interface device in the network may be a base station, an access point, an access network, etc. A network generally contains multiple network interface devices, each communicating with user terminals within a particular area.

The air interface in different networks may use different wireless technologies, may operate on different frequencies, may adopt different communication protocols, and may provide different data rates. A network interface device may provide network access to multiple user terminals using access schemes such as time division multiple access (TDMA), frequency division multiple access (FDMA), code division multiple access (CDMA), orthogonal frequency division multiple access (OFDMA), or a combination thereof. The network interface device and the user terminals also follow a set of rules referred to as a communication protocol in communicating with each other. A radio access technology, or RAT, generally refers to the combination of the access scheme and the communication protocol of the air interface of a network.

A radio access technology may be suited better for a particular type of service than for other services. For example, the radio access technology of a cellular network is most efficient in providing cellular services, i.e., roaming telephone services; and the radio access technology of a computer area network is suited for providing fast data connections to components within its limited area. A network with a limited coverage area is generally capable of providing higher data rates or a better connection quality than a network with a more expansive coverage area.

A current trend is to integrate existing networks so that users can enjoy the benefits of all of the existing networks. For example, when a user browses the Internet on a train using a cellular phone, the only accessible network may be a cellular network. However, when the user arrives home or at the office, an area network such as a LAN may be a better network because of the higher data rates the LAN provides. In such a situation, it is desirable to allow the cellular phone to have access to the LAN and also desirable to allow the cellular phone to automatically switch from the cellular network to the LAN without having to first disconnect from the cellular network. Similarly, in a system with multiple network interface devices associated with multiple RATs, it may be desirable to allow a user terminal to switch between the RATs without interrupting the communication. Such a switch between different RATs is often referred to as vertical handover (VHO). In contrast to a vertical handover, horizontal handover takes place in networks with a single RAT.

Before a horizontal or vertical handover takes place, the network interface device in communication with the user terminal, generally referred to as the serving network interface device, has to schedule a time interval during which the communication between the serving network interface device and the user terminal is temporarily suspended, and the user terminal measures the signals of neighboring network interface devices. The measurements are referred to hereinafter as handover measurements. Based on the measurement results, the user terminal or the network interface device or the network determines whether a handover should take place.

Conventional scheduling of handover measurements in a system using a single RAT is explained with reference to FIG. 1, which illustrates the scheduling of handover measurements defined in the IEEE 802.16e standard.

In IEEE 802.16e, the network interface devices are base stations, and the user terminals are mobile stations. Each base station continuously transmits broadcast signals that can be detected by all mobile stations. When a mobile station (MS) needs to measure the broadcast signals from neighboring base stations in preparation of a handover, communication with the serving base station is temporarily suspended. The measurement results may be reported back to the serving base station. Based on the measurement results, the network, the base station, or the user terminal determines whether a handover should take place.

The MS may initiate the handover measurements on its own by sending a request to the serving base station. Alternatively, the serving base station may issue a command to the MS to initiate the measurements. The period from the initiation of the handover measurements to the completion of all the measurements and necessary reports thereof is referred to as a handover measurement period.

In the example shown in FIG. 1, the handover measurements are initiated by the base station. The serving base station is base station BS1, and the neighboring base stations include base stations BS2 and BS3. BS1 issues a command "MOB_SCN-RSP" to the MS to instruct the MS to measure signals from the neighboring base stations including BS2 and BS3. (Step 101.) The MOB_SCN-RSP command includes several parameters: "start frame," "scanning interval," "interleaving interval," and "iteration." "Start frame" specifies when the MS should start the measurements, "scanning interval" specifies how much time the measurements should take, "iteration" specifies how many scanning intervals are allocated for the measurements, and "interleaving interval" specifies the time interval between two adjacent scanning intervals. Normal communication between the MS and BS1 is temporarily suspended during the scanning interval and resumes during the interleaving interval. If measurement results need to be reported, the report is submitted during the interleaving interval. "Start frame," "scanning interval," and "interleaving interval" are all specified in numbers of frames. A frame is a data unit upon which a network operates, and consists of a specified number of bits of information including user data and network overhead information. For a particular RAT, a frame may have a particular time duration.

Therefore it is customary to specify the size of a frame in units of time, and to specify time durations in units of frame. In the example shown in FIG. 1, the MS should start the measurement at the M-th frame after the MS receives the MOB_SCN-RSP command, measure the signals from BS2 and BS3 for N frames, resume communication with BS1 for P frames, and measure additional neighboring base stations during the additional scanning intervals.

During the scanning interval, the MS detects the broadcast signals from BS2, synchronizes to BS2, and measures the signals from BS2. (Step 102.) Then the MS repeats the same process for BS3. (Step 103.) If the signals from a neighboring base station are weak, the MS does not need to report the measurement results to BS1. If the signals from a neighboring base station are strong, then the MS will need to submit a report to BS1. A threshold parameter may be set by the network for determining when a report needs to be submitted. FIG. 1 assumes that the signals from at least one of BS2 and BS3 exceed the threshold, and the MS needs to report back to BS1.

At the beginning of the interleaving interval, normal communication between the MS and BS1 resumes, and the MS sends a request to BS1 for additional bandwidth for submitting the report. (Step 104.) Upon receiving allocation of resource (Step 105) for the submission of the report, the MS sends the measurement results to BS1 using the allocated resource. (Step 106.) The report will be used by the network to determine whether the MS should switch over to BS2 or BS3. Alternatively, the MS may determine based on the measurement results if a handover is desired, and include in the report a request for handover.

If multiple scanning intervals have been allocated, the MS enters into another scanning interval at the end of the interleaving interval to measure signals from additional neighboring base stations.

In accordance with the IEEE 802.16e standard, the serving base station and its neighboring base stations all use the same RAT, all share the same frame size, and are all synchronized with one other. Because the time required for handover measurements depends on the timing information of the base stations to be measured, the timing uniformity across a single-RAT network renders determination of scanning intervals simple. Such a timing uniformity, however, does not exist in a multi-RAT system.

SUMMARY OF THE INVENTION

Consistent with embodiments of the present invention, there is provided a method for scheduling one or more handover measurements to be performed by a user terminal in a communications system using a plurality of radio access technologies (RATs), wherein the user terminal is in communication with a serving network interface device and is in the neighborhood of one or more neighboring network interface devices. The method includes gathering timing information of the one or more neighboring network interface devices, and determining at least one scanning interval using the timing information of the one or more neighboring network interface devices, the at least one scanning interval being a time period during which the user terminal performs the one or more handover measurements by measuring signals of the one or more neighboring network interface devices.

Consistent with embodiments of the present invention, there is also provided a method for a user terminal to perform one or more handover measurements in a communications system using a plurality of radio access technologies (RATs), wherein the user terminal is in communication with a serving network interface device of the system and is in the neighborhood of one or more neighboring network interface devices. The method includes receiving a command from the serving network interface device for performing the one or more handover measurements, the command specifying at least one scanning interval, temporarily suspending the communication with the serving network interface device and performing the one or more handover measurements during the at least one scanning interval by measuring signals of the one or more neighboring network interface devices; and transmitting a trigger signal to the serving network interface device upon completion of the one or more handover measurements to resume the communication with the serving network interface device.

Consistent with embodiments of the present invention, an apparatus in a communications system using a plurality of radio access technologies (RATs) is configured for gathering timing information of the one or more neighboring network interface devices; and determining at least one scanning interval using the timing information of the one or more neighboring network interface devices, the at least one scanning interval being a time period during which a user terminal performs one or more handover measurements by measuring signals of the one or more neighboring network interface devices.

Additional features and advantages of the invention will be set forth in part in the description which follows, and in part will be apparent from that description, or may be learned by practice of the invention. The features and advantages of the invention will be realized and attained by means of the elements and combinations particularly pointed out in the appended claims.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain features, advantages, and principles of the invention.

In the drawings.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Consistent with embodiments of the present invention, there are provided methods for scheduling handover measurements in a multi-RAT system.

Figure 2:
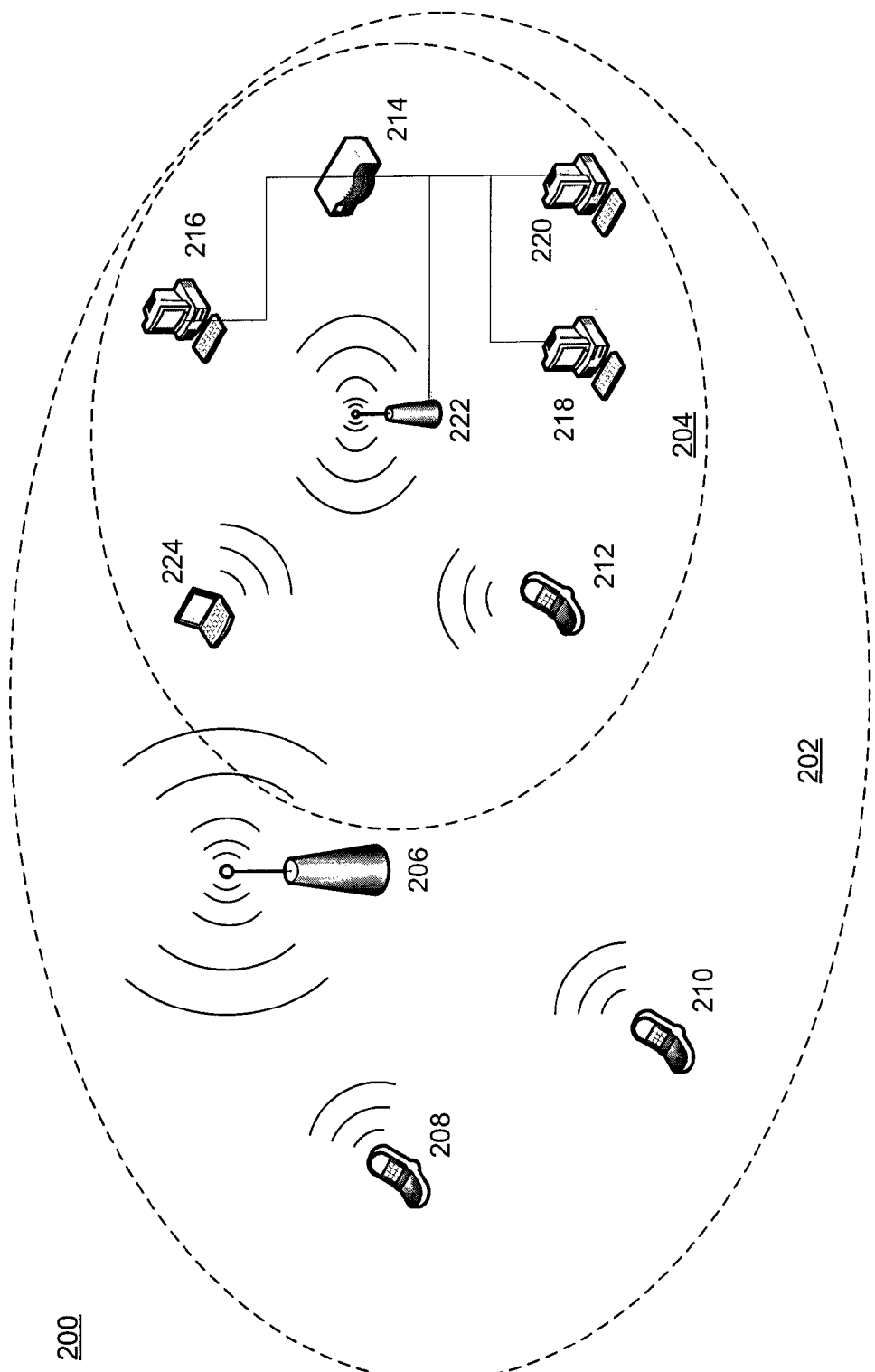
FIG. 2 shows an exemplary system with multiple radio access technologies.

FIG. 2 shows an exemplary multi-RAT system 200. System 200 includes multiple wireless networks, e.g., a cellular network 202, a computer LAN 204, etc. Cellular network 202 includes a network interface device 206 that communicates wirelessly with multiple cellular phones 208, 210, 212, etc. Computer LAN 204 includes a router 214 that routes data traffic between LAN devices such as computers 216, 218, 220, etc. A network interface device 222 is connected to router 214 to provide wireless coverage in LAN 204. For example, laptop 224 may access LAN 204 through a wireless connection with network interface device 222.

Cellular network 202 may have coverage that overlaps the coverage of LAN 204, as indicated by the dashed circles in FIG. 2. As a result, cellular phones 208, 210, 212 may at times be covered by both cellular network 202 and LAN 204. When a cellular phone, e.g., cellular phone 212, is covered by both networks, it may be desirable, depending on the service being used by the user, to have cellular phone 212 operate on LAN 204 rather than cellular network 202, or vice versa, and a vertical handover takes place when cellular phone 212 switches between the two networks. Depending on whether cellular phone 212 is switching from cellular network 202 to LAN 204 or from LAN 204 to cellular network 202, network interface device 206 or 222 needs to schedule handover measurements for cellular phone 212 before the handover takes place.

In a multi-RAT system such as system 200 shown in FIG. 2, the different RATs may have different frame sizes, and the serving network interface device, e.g., network interface device 206 or 222, cannot accurately determine the scanning intervals based on its own timing information. If the scanning interval is too short, the user terminal may not be able to synchronize to the neighboring network interface devices and complete the measurements during the short period. To avoid this problem, the serving network interface device needs to be conservative in determining the scanning interval, which means, compared to single-RAT systems, either the interleaving interval will be much shorter or the handover measurement period will be much longer. Either way, system efficiency is less than optimal.

Consistent with embodiments of the present invention, there is provided a method for optimizing a scanning interval during which normal communication between a user terminal and a serving network interface device is temporarily suspended for the user terminal to detect and measure signals from neighboring network interface devices.

Consistent with embodiments of the present invention, to determine a scanning interval, specific timing information of each neighboring network interface device to be measured is first gathered. The specific timing information may include, for example, the frame size. For handover measurements initiated by the serving network interface device, the serving network interface device may obtain such information from the individual neighboring network interface devices or, if the information is stored on a network server, from such network server. In handover measurements initiated by the user terminal, the user terminal may gather the information of each neighboring network interface device that supports the user terminal, and transmit the information along with a request for performing handover measurements. Alternatively, the user terminal may simply send a request to the serving network interface device, in response to which the serving network interface device gathers the timing information of the neighboring network interface devices and determines the scanning interval. The request from the user terminal may identify which neighboring network interface devices support the user terminal.

Using such timing information of the neighboring network interface device, an optimal scanning interval may be calculated. In one aspect, assuming two neighboring network interface devices need to be measured during a scanning interval, the serving network interface device has a frame size of S, one of the neighboring network interface devices has a frame size of $P_2$, and the other has a frame size of $P_3$, then the scanning interval may be $$\left\lceil \frac{P_2 + P_3 + 2\rho}{S} \right\rceil$$

in units of the frame size S of the serving network interface device, where $\rho$ is the time required for the MS to switch between the operation frequencies of the serving network interface device and the neighboring network interface devices, and $\lceil x \rceil$ is the ceiling function which gives the smallest integer greater than x. The frame sizes S, $P_2$, $P_3$, and any frame size mentioned below are specified in units of time, e.g., milliseconds. The above formula for calculating the scanning interval is based on the assumption that one frame duration of a network interface device is sufficient for a user terminal to measure the signals of that network interface device.

Assuming S=5 ms, $P_2$=2 ms, $P_3$=10 ms, and $\rho$=2 ms, then the scanning interval will be 4 frames of the serving network interface device. In contrast, if the serving network interface device calculates the scanning interval only based on its own timing information, the scanning interval would be $$\left\lceil \frac{5 + 5 + 2 \times 2}{5} \right\rceil = 3$$

frames, which may be insufficient for the user terminal to complete the measurements of the two neighboring network interface devices. On the other hand, if the serving network interface device only knows that the maximum frame size of the network interface devices in the system is 10 ms, and tries to be conservative, then the scanning interval will be $$\left\lceil \frac{10 + 10 + 2 \times 2}{5} \right\rceil = 5$$

frames of the serving network interface device, which will be wasteful of system resources.

More generally, consistent with embodiments of the present invention, assuming among the neighboring network interface devices, $N_1$ network interface devices have a frame size of $P_1$, $N_2$ network interface devices have a frame size of $P_2$, ..., and $N_k$ network interface devices have a frame size of $P_k$, then the scanning interval will be $$\left\lceil \frac{\left(\sum_{i=1}^{k} N_i P_i\right) + k \times \rho}{S} \right\rceil$$

frames of the serving network interface device.

The neighboring network interface devices may be measured over multiple scanning intervals, in which case the neighboring network interface devices may be divided into several groups and the user terminal measures each group within a scanning interval. The scanning intervals may be distributed evenly, or individually configured according to the group of network interface devices to be measured during each scanning interval. In the latter case, assuming the neighboring network interface devices are divided into k groups, and the i-th group includes a number $N_{i,j}$ of network interface devices respectively having a frame size $P_{i,j}$ in units of time, wherein i=1, 2, ..., k, and j=1, 2, ..., $N_{i,j}$, then the i-th scanning interval for the i-th group is $$\left\lceil \sum_{j=1}^{N_{i,j}} \frac{P_{i,j} + \rho}{S} \right\rceil$$

in units of frame of the serving network interface device.

In one aspect, the scanning intervals are determined by the serving network interface device or the network and transmitted in a command to the user terminal to initiate the handover measurements. In another aspect, the scanning intervals are determined by the user terminal and transmitted in a request to the serving network interface device for performing handover measurements. The serving network interface device may adopt the calculation of the scanning intervals by the user terminal or modify the calculation in accordance with network status.

It is to be understood that the formulae given above for calculating the scanning intervals are only exemplary and do not limit the scope of the present invention. The information of the neighboring network interface devices obtained consistent with embodiments of the present invention may be used in any way to optimize the scanning intervals. When implementing a wireless system, one skilled in the art may, without deviating from the spirit of the present invention, adopt any suitable algorithm for calculating the scanning interval after obtaining the timing information of the neighboring network interface devices.

Referring back to FIG. 1, after the MS finishes the measurements of the BS2 and BS3, the MS has to wait until the interleaving interval to request a bandwidth for reporting, and has to wait for BS1 to allocate the bandwidth to submit the report of the measurement results. The delay between the measurements (Steps 102 and 103) and the reporting of the measurements (Step 106) can be significant and often results in inaccuracy, as a result of which the network might erroneously determine that handover should take place even though handover is no longer necessary, or vice versa. Moreover, the MS sometimes finishes the measurements early in the scanning interval, yet the MS and BS1 still have to wait until the scanning interval is over to resume communication. Such a reporting delay limits system capacity.

Consistent with embodiments of the present invention, there is provided a method for early termination of the scanning interval that allows the user terminal to send a trigger signal immediately upon the completion of handover measurements to resume normal communication between the user terminal and the serving network interface device.

The scanning interval is calculated to be sufficient for the user terminal to complete the handover measurements. However, the user terminal often finishes the handover measurements sooner, in which case the user terminal immediately triggers an early termination of the scanning interval and an early resumption of normal communication with the serving network interface device. To do so, the user terminal sends a trigger signal to the serving network interface device to indicate that the measurements are completed. Upon receiving the trigger signal from the user terminal, the serving network interface device resumes the normal communication with the user terminal. Thus, through the immediate resumption of normal communication, the portion of the scanning interval that would have been wasted is now used for normal communication, and system efficiency is improved.

Figure 1:
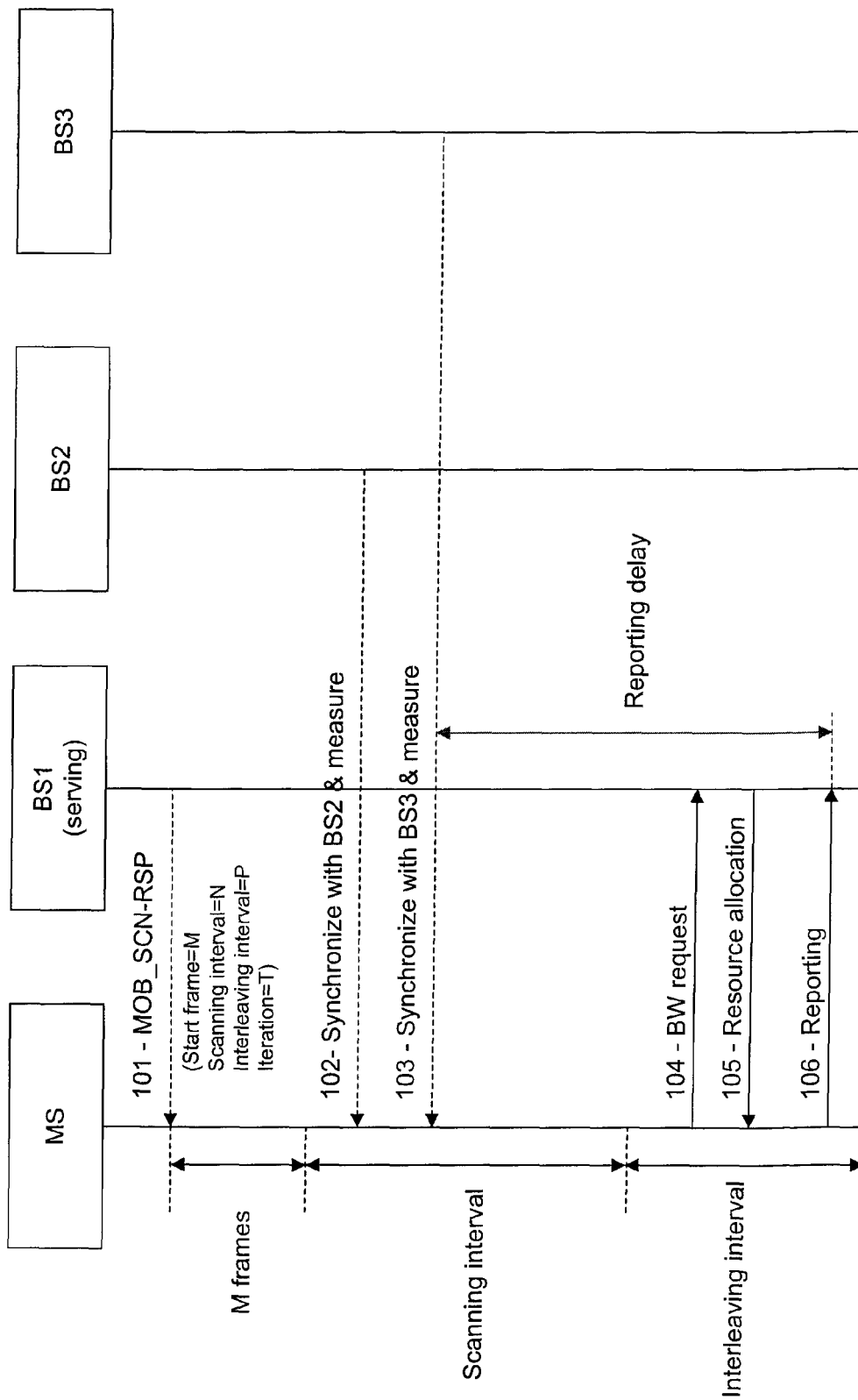
FIG. 1 illustrates the scheduling of handover measurement defined in the IEEE 802.16e standard.

In one aspect, the trigger signal may also serve to indicate to the serving network interface device whether a measurement report will be submitted. If a report is necessary, the trigger signal acts as a request for resources for submitting the report. Upon receiving the trigger signal, the serving network interface device determines whether resources need to be allocated for handing the report, and if so, allocates the resources. Compared to the conventional reporting scheme as shown in FIG. 1, the reporting mechanism consistent with the embodiments of the present invention reduces reporting delay, and improves reporting accuracy.

Whether a report is necessary depends on the implementation of the network. For example, the network may set a threshold, such that handover is not desirable if the measured signal strength is below the threshold. However, different implementations may be used without deviating from the spirit of the present invention.

Thus, in one aspect, the trigger signal may indicate to the serving network interface device that the handover measurements have been completed. In another aspect, the trigger signal may indicate to the serving network interface device not only that the handover measurements have been completed, but whether a report needs to be submitted.

Minimal resource may be allocated to the user terminal for sending the trigger signal. For example, the user terminal may use a random access channel or a particularly reserved channel to send the trigger signal. A channel is a defined route for conveying information from one point to another, and a random access channel is a channel that can be used by any user terminal to gain access to the network or to transmit small amounts of data. One skilled in the art would understand that various definitions of channels exist in the field of communications, such as a frequency channel, a physical channel, a code channel, or a combination thereof. When a channel dedicated for sending trigger signals is shared among multiple user terminals, the channel may be further divided to distinguish the user terminals. The further division may be in the form of divided time periods, divided frequency bands, or distinct signal patterns, etc. In the example of a system using orthogonal frequency division multiplexing (OFDM) or orthogonal frequency division multiple access (OFDMA) combined with code division multiple access (CDMA), the dedicated channel may be a particular frequency channel, and each user terminal using that particular frequency channel is further assigned a distinct code for transmitting the trigger signal. If the trigger signal also indicates to the serving network interface device whether a report needs to be submitted, two codes may be assigned to each user terminal to distinguish the situation when a report needs to be submitted from the situation when a report does not need to be submitted.

When the user terminal is measuring signals from the neighboring network interface devices, the serving network interface device monitors the dedicated channel and, if any, particular signal patterns (such as codes) assigned to the user terminal. In response to a trigger signal from the user terminal, the serving network interface device resumes normal communication with the user terminal. If the trigger signal also indicates whether a report will be submitted, the serving network interface device determines whether or not to further allocate resources for the submission of the report. The resources allocated for the report may be an additional dedicated channel, or an allotted time period on the channel that already carries the normal communication between the user terminal and the serving network interface device, etc.

Thus, consistent with embodiments of the present invention, if the scanning interval is 3 frames of the serving network interface device, and the user terminal actually completes the measurements of the neighboring network interface device within the first frame, the remaining 2 frames are released for normal communication. As a result, normal communication time is maximized and system efficiency is improved. Further, if the trigger signal indicates whether a report is needed, the reporting delay is also shortened, compared to conventional scheduling schemes such as that shown in FIG. 1, according to which the user terminal has to wait until the end of the scanning interval to request resource for submission of the report.

Figure 3:
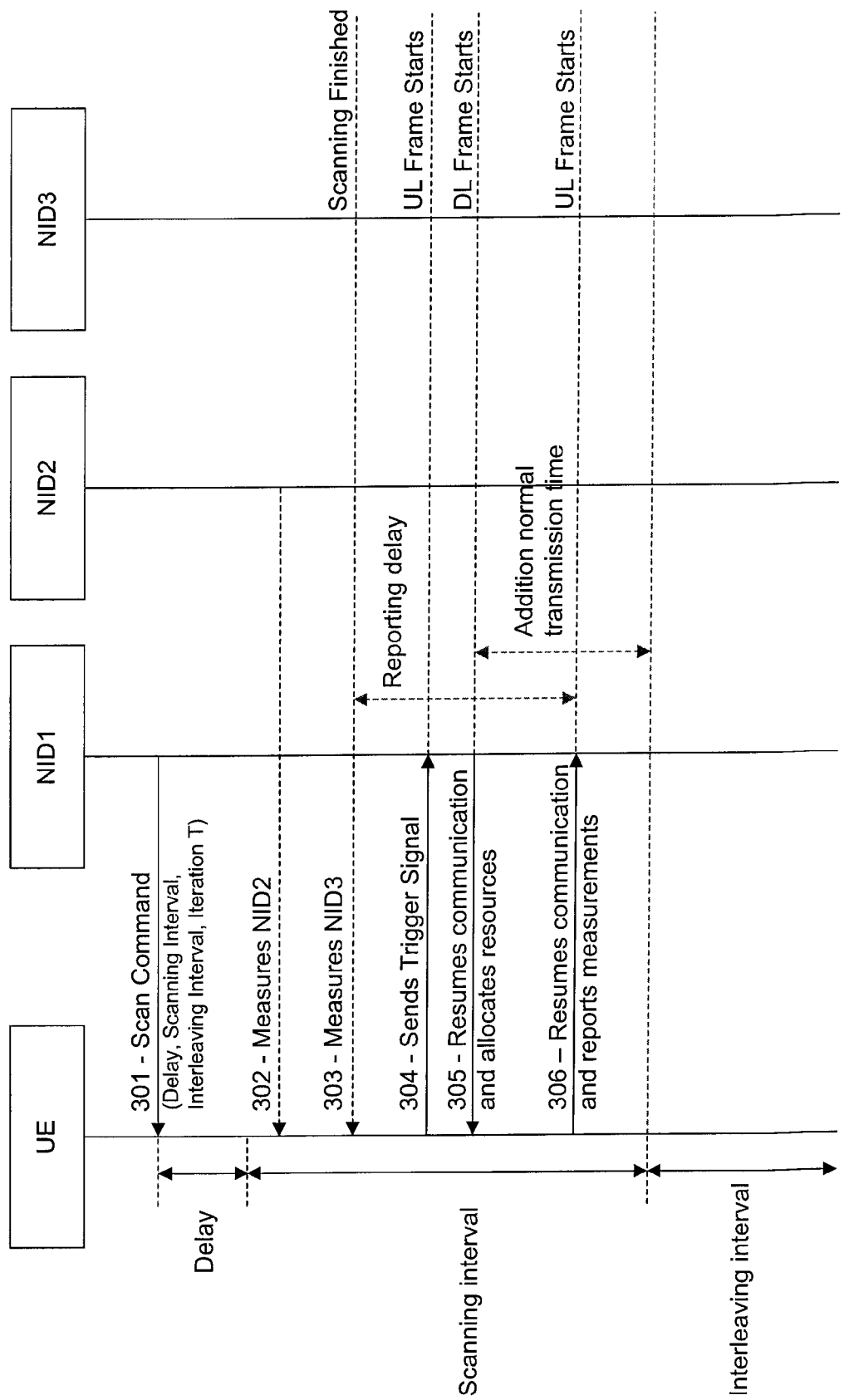
FIG. 3 shows an example of a handover measurement process initiated by a network interface device in a multi-RAT system.
Figure 4:
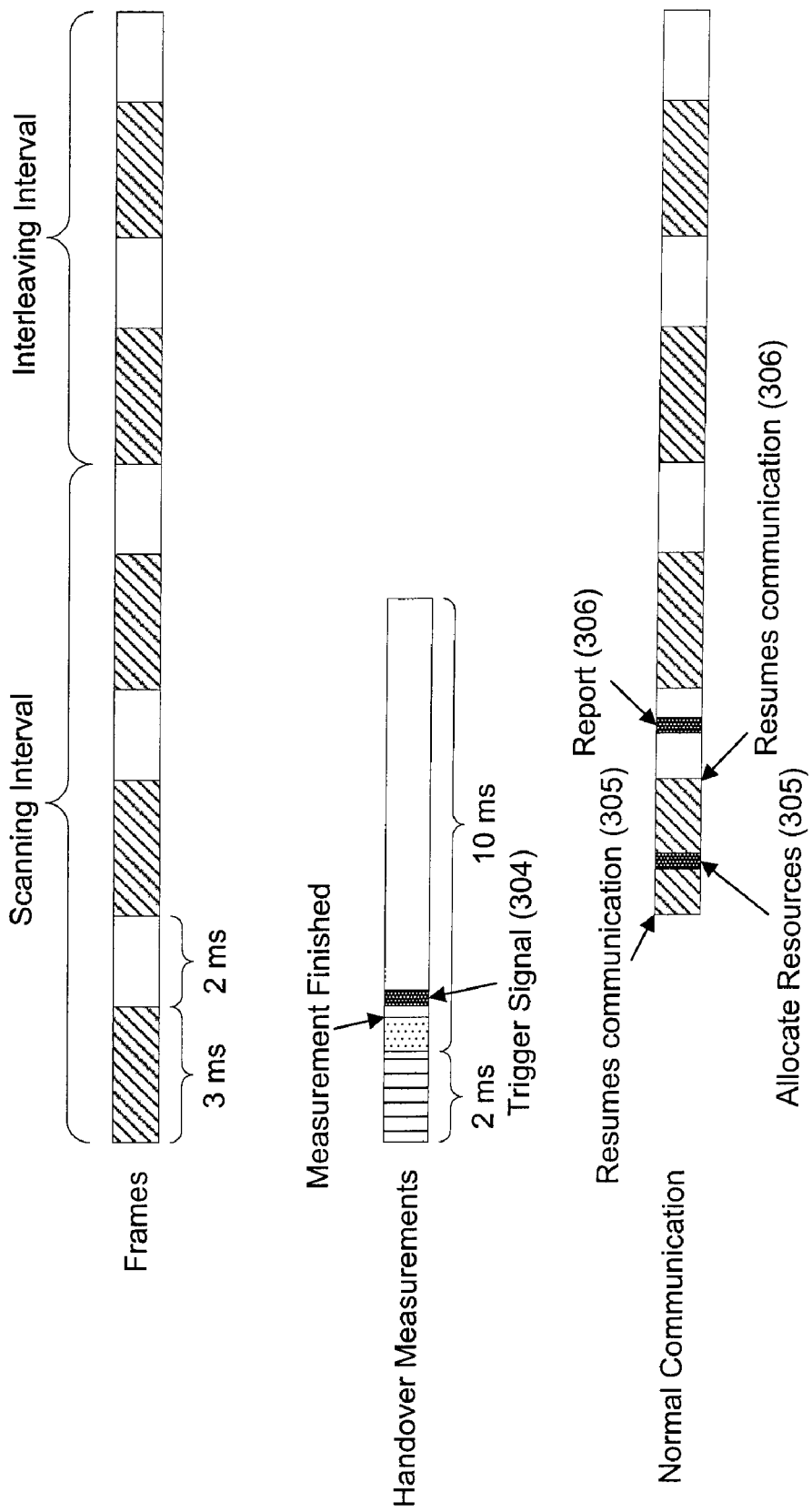
FIG. 4 shows a more detailed example of the handover measurement process of FIG. 3.
Figure 5:
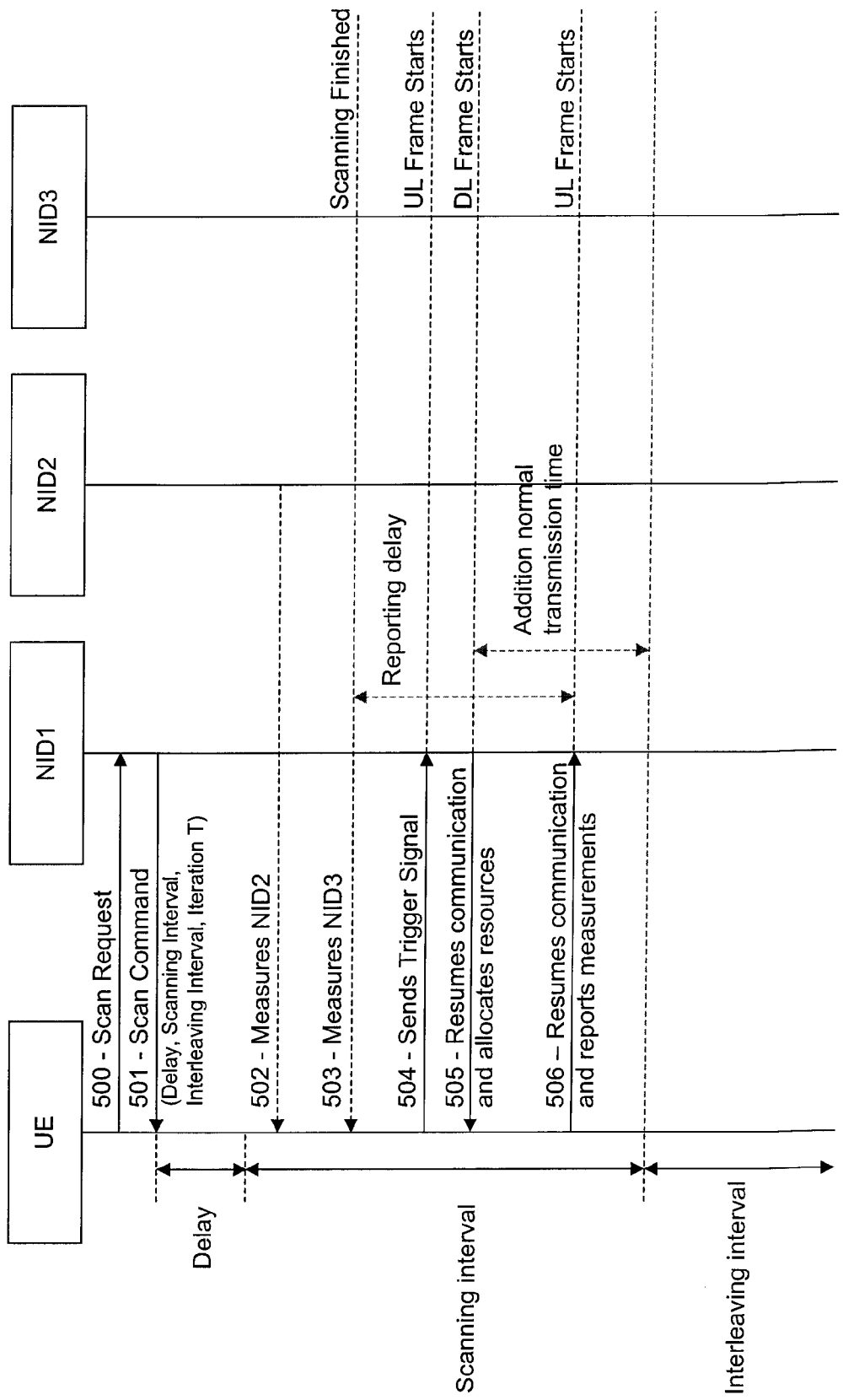
FIG. 5 shows an example of user terminal initiated handover measurement process in a multi-RAT system.

FIGS. 3-5 illustrate examples of handover measurements consistent with embodiments of the present invention. In FIGS. 3-5, it is assumed that the network implements a time division duplex (TDD) scheme. In TDD, data transmission from the user terminal to the network interface device, i.e., uplink transmission, and data transmission from the network interface device to the user terminal, i.e., downlink transmission, are separate in time but not in frequency. In other words, each frame is divided into two sub-frames, one for the uplink and one for the downlink. It is to be understood that the present invention is equally applicable to systems using other duplex schemes.

FIG. 3 shows an example of a handover measurement process initiated by the serving network interface device. First, the serving network interface device (NID1) issues a scan command to the user terminal (UE). (Step 301.) The scan command may include information such as a delay before the user terminal starts the measurements, one or more scanning intervals during which the user terminal measures neighboring network interface devices, one or more interleaving intervals during which normal communication between NID1 and the UE is resumed, and an iteration number T indicating how many scanning intervals have been allocated.

In the example given in FIG. 3, the UE needs to measure two neighboring network interface devices NID2 and NID3 in the first scanning interval. Upon receiving the scan command and after the appropriate delay, the UE switches over to the operating frequency of one of the neighboring network interface device, e.g., NID2, synchronizes to NID2 downlink transmission, and measures the broadcast signals of NID2. (Step 302.) After the measurement of NID2 is completed, the UE switches to the operating frequency of NID3, synchronizes to NID3 downlink transmission, and measures the broadcast signals of NID3. (Step 303.)

When the measurements of NID2 and NID3 are completed, and in the next immediately available uplink sub-frame, the UE sends a trigger signal to the serving network interface device NID1 to indicate that the measurements are completed. (Step 304.) In the example given in FIG. 3, it is assumed that the trigger signal also indicates whether a report will be submitted. If the signal strength of one or both of NID2 and NID3 exceeds a threshold, the trigger signal indicates that a report will be submitted, in which case the serving network interface device NID1 allocates resources for handling the report in the next downlink sub-frame (Step 305). In the meantime, upon receiving the trigger signal, the serving network interface device NID1 understands that normal communication with the UE can be resumed, and does so also in the next downlink sub-frame (Step 305).

In the next uplink sub-frame, the user terminal resumes normal communication. and submits the measurement report using the allocated resources. (Step 306.)

As shown in FIG. 3, through the triggered early termination of the scanning interval, additional time is used for normal communication between the user terminal and the serving network interface device, thereby improving system efficiency. In addition, the delay between the handover measurements and the report is shortened compared to conventional handover measurement schemes such as that defined in IEEE 802.16e, thereby improving the reporting accuracy.

FIG. 4 gives a more detailed example of the handover measurement process of FIG. 3. It is assumed in FIG. 4 that the frequency switch time is 2 ms, and the frame size of the serving network interface device is 5 ms, of which the downlink sub-frame is 3 ms and the uplink sub-frame is 2 ms. Only one neighboring network interface device needs to be measured, and the frame size thereof is 10 ms. Consistent with the embodiments of the present invention, the serving network interface device allocates $$\left\lceil \frac{10+2}{5} \right\rceil = 3$$

frames as the scanning interval. The interleaving interval is 2 frames.

The top portion of FIG. 4 shows 5 frames, covering one scanning interval and one interleaving interval. The shaded blocks represent downlink sub-frames and the empty blocks represent the uplink sub-frames. The middle portion of FIG. 4 shows the amount of time expected for the handover measurement, including 2 ms for the frequency switch, and 10 ms for the handover measurement, which is the frame size of the neighboring network interface device to be measured. The bottom portion of FIG. 4 shows the time period of normal communication. The top, middle, and bottom portions of FIG. 4 are aligned to one another in time.

Although in certain situations the UE may need the whole frame of the neighboring network interface device to be measured, i.e., 10 ms, to complete the handover measurement, more often the UE can complete the measurement in a shorter period. The example shown in FIG. 4 assumes that the UE finishes the measurement within 1 ms. In the next available uplink sub-frame, the UE sends a trigger signal to the serving network interface device, corresponding to Step 304 in FIG. 3. It is assumed that the trigger signal also indicates that a report needs to be submitted and contains a request for resources for handling the report.

Then, in the next downlink sub-frame, the serving network interface device resumes normal communication with the UE and in the mean time allocates resources for the UE to submit the measurement report, corresponding to Step 305 in FIG. 3.

In the next uplink sub-frame, the UE resumes normal communication with the serving network interface device, and submits the measurement report, corresponding to Step 306 in FIG. 3.

As FIG. 4 illustrates, through the early termination of the scanning interval, the normal communication time is increased from 2 frames to 4 frames. Moreover, the delay between the measurement and the report is a little over one frame of the serving network interface device, i.e., a little more than 5 ms. In contrast, if the UE has to wait until the interleaving interval to request resources, the delay would be over four frames, i.e., over 20 ms. Thus, the reporting scheme consistent with the present invention has an improved accuracy compared to conventional reporting schemes.

FIGS. 3 and 4 both assume that a report needs to be submitted after the completion of the handover measurements. In the situation where a report is unnecessary, the trigger signal would notify the serving network interface device accordingly, the serving network interface device need not allocate resources for reporting, and the user terminal need not submit the report; but the other steps are the same. The process in such a situation will now be readily understood by one of ordinary skill in the art and is not explained further.

FIG. 5 illustrates an example of a user terminal initiated handover measurement process. The only difference between the processes shown in FIG. 3 and FIG. 5 is that in FIG. 5, the UE first sends a request to the serving network interface device NID1 for performing handover measurements. (Step 500.) The steps that follow are the same as those shown in FIG. 3. More particularly, steps 501-506 are substantially the same as steps 301-306, respectively. It is to be understood, however, that the parameters for the handover measurements, i.e., the delay, the scanning interval, the interleaving interval, and the iteration number, etc., can be determined by either the user terminal or the serving network interface device, or other parts of the network. If the parameters are determined by the user terminal rather than by the network or the serving network interface device, such parameters may be transmitted in the request, and the serving network interface device may adopt these parameters or make necessary modifications.

It will be apparent to those skilled in the art that various modifications and variations can be made in the disclosed embodiments without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for scheduling one or more handover measurements to be performed by a user terminal in a communications system using a plurality of radio access technologies (RATs), wherein the user terminal is in communication with a serving network interface device and is in the neighborhood of one or more neighboring network interface devices, the method comprising:

gathering timing information of the one or more neighboring network interface devices; and determining at least one scanning interval using the timing information of the one or more neighboring network interface devices, the at least one scanning interval being a time period during which the user terminal performs the one or more handover measurements by measuring signals of the one or more neighboring network interface devices, wherein the serving network interface device has a frame size of S in units of time, and the one or more neighboring network interface devices belong to k different RATs and include $N_i$ network interface devices having a frame size of $P_i$ in units of time, wherein i=1, 2, ..., k, and wherein determining the at least one scanning interval comprises calculating the at least one scanning interval to be $$\left\lceil \frac{\left(\sum_{i=1}^{k} N_i P_i\right) + k \times \rho}{S} \right\rceil$$

in units of frame of the serving network interface device, wherein $\rho$ is a time required for the user terminal to switch from one operation frequency to another operation frequency, and $\lceil x \rceil$ is a ceiling function which gives the smallest integer greater than x.

2. A method for scheduling one or more handover measurements to be performed by a user terminal in a communications system using a plurality of radio access technologies (RATs), wherein the user terminal is in communication with a serving network interface device and is in the neighborhood of one or more neighboring network interface devices, the method comprising:

gathering timing information of the one or more neighboring network interface devices; and determining at least one scanning interval using the timing information of the one or more neighboring network interface devices, the at least one scanning interval being a time period during which the user terminal performs the one or more handover measurements by measuring signals of the one or more neighboring network interface devices, wherein the serving network interface device has a frame size of S in units of time, wherein the one or more neighboring network interface devices are divided into k groups, and an i-th group includes a number $N_{i,j}$ of neighboring network interface devices respectively having a frame size $P_{i,j}$ in units of time, wherein i=1, 2, ..., k, and j=1, 2, ..., $N_{i,j}$, and wherein determining the at least one scanning interval comprises calculating k scanning intervals, wherein an i-th scanning interval during which the user terminal performs the one or more handover measurements of the i-th group of neighboring network interface devices is $$\left\lceil \sum_{j=1}^{N_{i,j}} \frac{P_{i,j} + \rho}{S} \right\rceil$$

in units of frame of the serving network interface device, wherein $\rho$ is a time required for the user terminal to switch from one operation frequency to another operation frequency, and $\lceil x \rceil$ is a ceiling function which gives the smallest integer greater than x.

3. The method of claim 1, further comprising:

receiving a command from the serving network interface device for performing the one or more handover measurements, the command specifying at least one scanning interval;

temporarily suspending the communication with the serving network interface device and performing the one or more handover measurements by measuring signals of the one or more neighboring network interface devices; and transmitting a trigger signal to the serving network interface device using a random access channel or a reserved channel upon completion of the one or more handover measurements to resume the communication with the serving network interface device during the at least one scanning interval.

4. The method of claim 3, further comprising determining whether a report of the one or more handover measurements will be submitted based on a threshold parameter specified by the system.

5. The method of claim 4, wherein the transmitting of the trigger signal comprises indicating to the serving network interface device whether the report of the one or more handover measurements will be submitted, wherein the indicating to the serving network interface device comprises requesting a resource for submitting the report of the one or more handover measurements if such report will be submitted, the method further comprising receiving allocation of the resource for submitting the report of the one or more handover measurements and submitting the report using the allocated resource.

6. The method of claim 3, wherein the transmitting of the trigger signal comprises transmitting the trigger signal using one of two assigned signal patterns to indicate that a report of the one or more handover measurements will be submitted, or using the other one of the two assigned signal patterns to indicate that the report of the one or more handover measurements will not be submitted.

7. The method of claim 2, further comprising:
receiving a command from the serving network interface device for performing the one or more handover measurements, the command specifying at least one scanning interval;
temporarily suspending the communication with the serving network interface device and performing the one or more handover measurements by measuring signals of the one or more neighboring interface devices; and
transmitting a trigger signal to the serving network interface device using a random access channel or a reserved channel upon completion of the one or more handover measurements to resume the communication with the serving network interface device during the at least one scanning interval.

8. The method of claim 7, further comprising determining whether a report of the one or more handover measurements will be submitted based on a threshold parameter specified by the system.

9. The method of claim 8, wherein the transmitting of the trigger signal comprises indicating to the serving network interface device whether the report of the one or more handover measurements will be submitted, wherein the indicating to the serving network interface device comprises requesting a resource for submitting the report of the one or more handover measurements if such the report will be submitted and further comprising receiving allocation of the resource for submitting the report of the one or more handover measurements and submitting the report using the allocated resource.

10. the method of claim 7, wherein the transmitting of the trigger signal comprises transmitting the trigger signal using an assigned signal pattern, the assigned signal pattern being one of two assigned signal patterns to indicate that a report of the one or more handover measurements will be submitted, or using the other one of the two assigned signal patterns to indicate that the report of the one or more handover measurements will not be submitted.

11. An apparatus for scheduling one or more handover measurements to be performed in a communications system using a plurality of radio access technologies (RATs), wherein the apparatus is in communication with a serving network interface device and is in the neighborhood of one or more neighboring network interface devices, the apparatus being configured to:
gather, at the apparatus, timing information of the one or more neighboring network interface devices; and
determine, at the apparatus, at least one scanning interval using the timing information of the one or more neighboring network interface devices, the at least one scanning interval being a time period during which the apparatus performs the one or more handover measurements by measuring signals of the one or more neighboring network interface devices,
wherein the serving network interface device has a frame size of S in units of time, and the one or more neighboring network interface devices belong to k different RATs and include $N_i$ network interface devices having a frame size of $P_i$ in units of time, wherein i=1, 2, ..., k, and
wherein the apparatus calculates the at least one scanning interval to be $$\left\lceil \frac{\left(\sum_{i=1}^{k} N_i P_i\right) + k \times \rho}{S} \right\rceil$$

in units of frame of the serving network interface device, wherein $\rho$ is a time required for the apparatus to switch from one operation frequency to another operation frequency, and $\lceil x \rceil$ is a ceiling function which gives the smallest integer greater than x.

12. The apparatus of claim 11, further configured to:
receive, at the apparatus, a command from the serving network interface device for performing the one or more handover measurements, the command specifying the at least one scanning interval;
temporarily suspend the communication with the serving network interface device and perform the one or more handover measurements by measuring signals of the one or more neighboring network interface devices; and
transmit, from the apparatus, a trigger signal to the serving network interface device using a random access channel or a reserved channel upon completion of the one or more handover measurements to resume the communication with the serving network interface device during the at least one scanning interval.

13. The apparatus of claim 12, further configured to determine whether a report of the one or more handover measurements will be submitted based on a threshold parameter specified by the system.

14. The apparatus of claim 13, wherein the transmitting of the trigger signal comprises indicating to the serving network interface device whether a report of the one or more handover measurements will be submitted, wherein the indicating to the serving network interface device comprises requesting a resource for submitting a report of the one or more handover measurements if such a report will be submitted, and wherein the apparatus is further configured to receive allocation of the resource for submitting the report of the one or more handover measurements and to submit the report using the allocated resource.

15. The apparatus of claim 12, wherein the transmitting of the trigger signal comprises transmitting the trigger signal using one of two assigned signal patterns to indicate that a report of the one or more handover measurements will be submitted, or using the other one of the two assigned signal patterns to indicate that the report of the one or more handover measurements will not be submitted.

16. An apparatus for scheduling one or more handover measurements to be performed in a communications system using a plurality of radio access technologies (RATs), wherein the apparatus is in communication with a serving network interface device and is in a neighborhood of one or more neighboring network interface devices, the apparatus being configured to:

gather, at the apparatus, timing information of the one or more neighboring network interface devices; and determine, at the apparatus, at least one scanning interval using the timing information of the one or more neighboring network interface devices, the at least one scanning interval being a time period during which the apparatus performs the one or more handover measurements by measuring signals of the one or more neighboring network interface devices, wherein the serving network interface device has a frame size of S in units of time, wherein the one or more neighboring network interface devices are divided into k groups, and an i-th group includes a number $N_{i,j}$ of neighboring network interface devices respectively having a frame size $P_{i,j}$ in units of time, wherein i=1, 2, ..., k, and j=1, 2, ..., $N_{i,j}$, and wherein the apparatus determines the at least one scanning interval by calculating k scanning intervals, wherein an i-th scanning interval during which a user terminal performs the one or more handover measurements of the i-th group of neighboring network interface devices is $$\left\lceil \sum_{j=1}^{N_{i,j}} \frac{P_{i,j} + \rho}{S} \right\rceil$$

in units of frame of the serving network interface device, wherein ρ is a time required for the apparatus to switch from one operation frequency to another operation frequency, and ⌈x⌉ is a ceiling function which gives the smallest integer greater than x.

17. The apparatus of claim 16, further configured to:
receive, at the apparatus, a command from the serving network interface device for performing the one or more handover measurements, the command specifying the at least one scanning interval;
temporarily suspend the communication with the serving network interface device and perform the one or more handover measurements by measuring signals of the one or more neighboring network interface devices; and
transmit, from the apparatus, a trigger signal to the serving network interface device using a random access channel or a reserved channel upon completion of the one or more handover measurements to resume the communication with the serving network interface device during the at least one scanning interval.

18. The apparatus of claim 17, further configured to determine whether a report of the one or more handover measurements will be submitted based on a threshold parameter specified by the system.

19. The apparatus of claim 18, wherein the transmitting of the trigger signal comprises indicating to the serving network interface device whether the report of the one or more handover measurements will be submitted, wherein the indicating to the serving network interface device comprises requesting a resource for submitting the report of the one or more handover measurements if such report will be submitted, and wherein the apparatus is further configured to receive allocation of the resource for submitting the report of the one or more handover measurements and to submit the report using the allocated resource.

20. The apparatus of claim 17, wherein the transmitting of the trigger signal comprises transmitting the trigger signal using one of two assigned signal patterns to indicate that a report of the one or more handover measurements will be submitted, or using the other one of the two assigned signal patterns to indicate that the report of the one or more handover measurements will not be submitted.

* * * * *